(12) United States Patent
Yanacek et al.

(10) Patent No.: US 9,900,301 B2
(45) Date of Patent: Feb. 20, 2018

(54) DEVICE MANAGEMENT WITH TUNNELING

(71) Applicant: Amazon Technologies, Inc., Reno, NV (US)

(72) Inventors: David Craig Yanacek, Seattle, WA (US); Rameez Loladia, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 107 days.

(21) Appl. No.: 14/968,697

(22) Filed: Dec. 14, 2015

(65) Prior Publication Data

US 2017/0171182 A1 Jun. 15, 2017

(51) Int. Cl.
| | |
|---|---|
| *H04L 29/06* | (2006.01) |
| *H04L 12/46* | (2006.01) |
| *H04L 29/08* | (2006.01) |
| *H04L 12/28* | (2006.01) |
| *H04W 4/00* | (2018.01) |
| *H04W 12/08* | (2009.01) |

(52) U.S. Cl.
CPC .......... *H04L 63/08* (2013.01); *H04L 12/4633* (2013.01); *H04L 63/029* (2013.01); *H04L 63/0281* (2013.01); *H04L 63/0876* (2013.01); *H04L 63/105* (2013.01); *H04L 67/28* (2013.01); *H04L 12/2818* (2013.01); *H04L 63/0272* (2013.01); *H04L 63/101* (2013.01); *H04L 63/166* (2013.01); *H04W 4/005* (2013.01); *H04W 12/08* (2013.01)

(58) Field of Classification Search
CPC ..... H04L 63/08; H04L 63/10; H04L 63/0281; H04L 63/029; H04L 63/105; H04L 12/4633; H04L 67/28

USPC ....................... 726/2–7, 11–12; 713/168–170
See application file for complete search history.

(56) References Cited

U.S. PATENT DOCUMENTS

| | | | | |
|---|---|---|---|---|
| 6,948,076 | B2* | 9/2005 | Saito | H04L 12/2805 713/151 |
| 7,681,229 | B1* | 3/2010 | Ebrahimi | H04L 63/0281 709/229 |
| 8,127,008 | B2* | 2/2012 | Manning | H04L 29/06 709/219 |
| 8,213,413 | B2* | 7/2012 | Poetker | H04L 29/06027 370/230 |
| 8,594,631 | B2* | 11/2013 | Lemilainen | H04L 63/062 455/411 |

(Continued)

*Primary Examiner* — Hosuk Song
(74) *Attorney, Agent, or Firm* — Hogan Lovells US LLP

(57) ABSTRACT

A device management service provide a centralized credential provisioning system which can instantiate a proxy device that facilitates remote connections between various computing devices and various client devices. The device management service can manage instances of proxy devices in a resource provider environment that are associated with various computing devices. When a client device requests to access a computing device, the device management service can identify an instance of a proxy device associated with the computing device. The instance of the proxy device and the computing device can be configured to securely connect using credentials exchanged through, and managed by, the device management service. The computing device can be instructed to connect to the instance of the proxy device, and the client device can be provided with access information for the instance of the proxy device.

18 Claims, 5 Drawing Sheets

(56) References Cited

U.S. PATENT DOCUMENTS 8,893,255 B1 * 11/2014 Martini .............. H04L 63/0884
709/238
9,092,613 B2 * 7/2015 Martini .................. G06F 21/44

* cited by examiner

DEVICE MANAGEMENT WITH TUNNELING

Increasingly, household devices are being enhanced to be able to connect to home computing networks and the Internet. These newly connected devices are often referred to as part of "the Internet of Things," and may include smart televisions, home automation devices, and other computing devices incorporated into common devices. This enables the computing devices in a given location (such as a home or business) to communicate with each other and for users to monitor their location, track device usage, etc. Over time, a user may want to change the configuration of their devices or debug the devices. In this case, a user may need to physically connect to the device to reconfigure it, or log-in to the device through a connection over a local network. However, these devices are often deployed in locations where they do not have unique IP addresses, or where the firewall policy limits inbound connectivity. This makes it difficult to communicate with these devices remotely. Further, allowing devices on a network to accept connections from any device that can find them can present a security vulnerability.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for remote device management in an electronic environment. In particular, various embodiments provide a centralized credential provisioning system which can instantiate a proxy device that facilitates remote connections between various computing devices and various client devices.

In some embodiments, a device management service provides a centralized credential provisioning system which can instantiate a proxy device that facilitates remote connections between various computing devices and various client devices. The device management service can manage instances of proxy devices in a resource provider environment that are associated with various computing devices. When a client device requests to access a computing device, the device management service can identify an instance of a proxy device associated with the computing device. The instance of the proxy device and the computing device can be configured to securely connect using credentials exchanged through, and managed by, the device management service. The computing device can be instructed to connect to the instance of the proxy device, and the client device can be provided with access information for the instance of the proxy device. In some embodiments, the proxy device can include a script that automatically connects the instance of the proxy device to the computing device after the client device connects to the proxy device.

Various other functions can be implemented within the various embodiments as well as discussed and suggested elsewhere herein.

Figure 1:
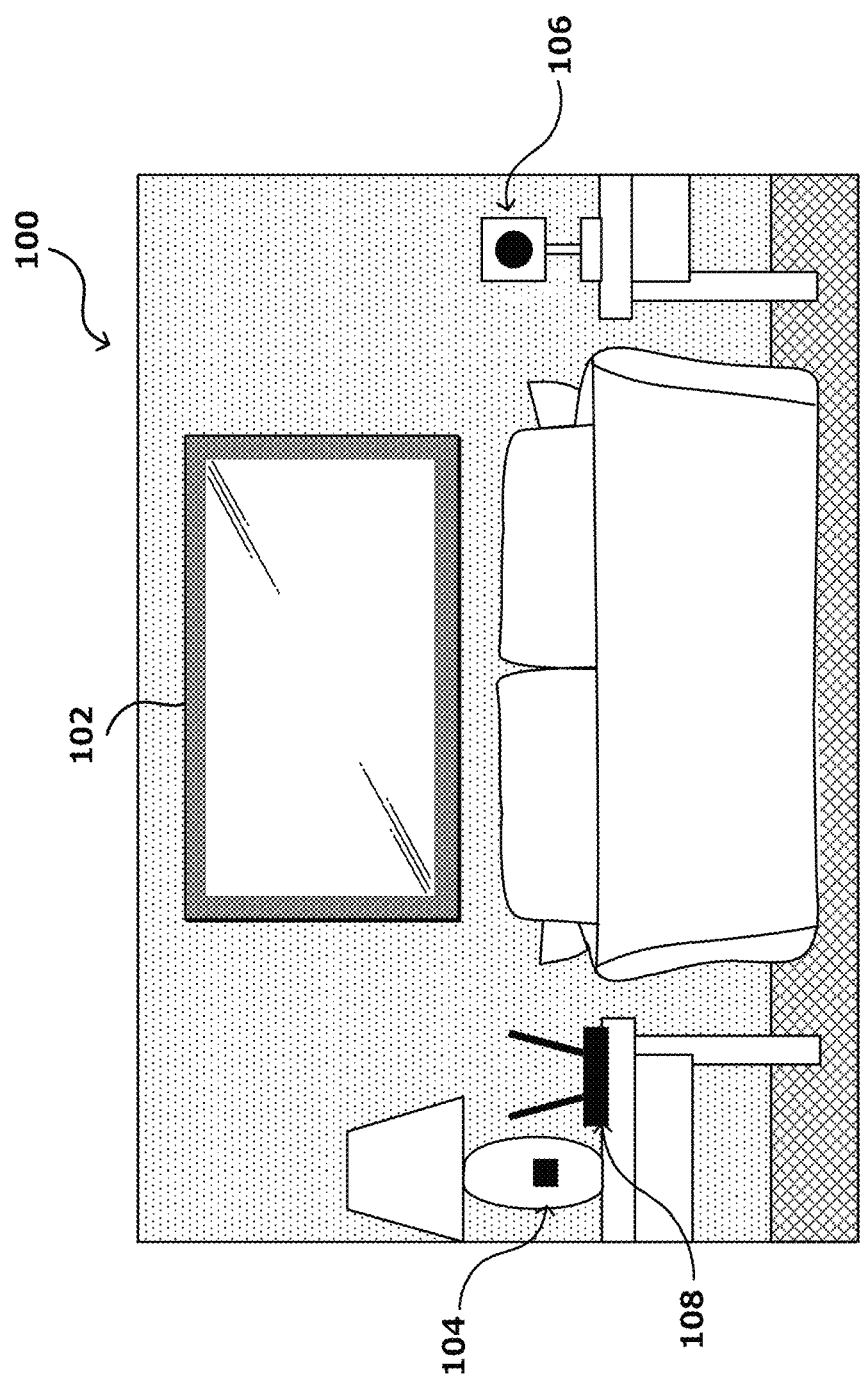
FIG. 1 illustrates an example environment in which computing devices that may be managed according to various embodiments can be deployed.

FIG. 1 illustrates an example environment 100 in which computing devices that may be managed according to various embodiments can be deployed. As shown in FIG. 1, a user may set up various devices in their home, such as a smart television 102, light controller 104, and camera 106. One common implementation of these computing devices includes home automation sensors and controllers. For example, camera 106 may record video data in the user's home and upload that data to a location accessible to the user, such as an object storage system or other network connected storage service. Some devices may be able to access a management interface, which allows uses to remotely control the devices. For example, if the user notices that lights were left on at home in the video provided by camera 106, the user can access the management interface to send an instruction to device 104 to turn off the light. Similarly, smart television may be controlled remotely to e.g., adjust recording schedules. Although a user can exchange data with the computing devices, the user is limited by the management interface to simple instructions and receiving data from the devices. To reconfigure or debug the devices, the user needs to log in to the devices directly. If the user is on the same local network as the devices (e.g., if the user is at home and connected to access point 108), then the user may be able to login to a device by navigating to an address assigned to that device by access point 108. However, outside of the local network, these devices are difficult to access. For example, the devices generally do not have an IP address from which they can be accessed from outside of the local network. Additionally, access point 108 generally provides a firewall or other security system that limits the types of incoming connections to devices on the network. The above examples have been described with respect to consumer devices, such as smart televisions and home automation devices. However, various computing devices may be configured in accordance with the embodiments described herein, e.g., industrial sensors (such as oil pipeline monitors, manufacturing sensors, temperature sensors and environmental controls, etc.), automotive sensors and traffic control and monitoring systems, medical devices, and other computing devices and systems.

Figure 2:
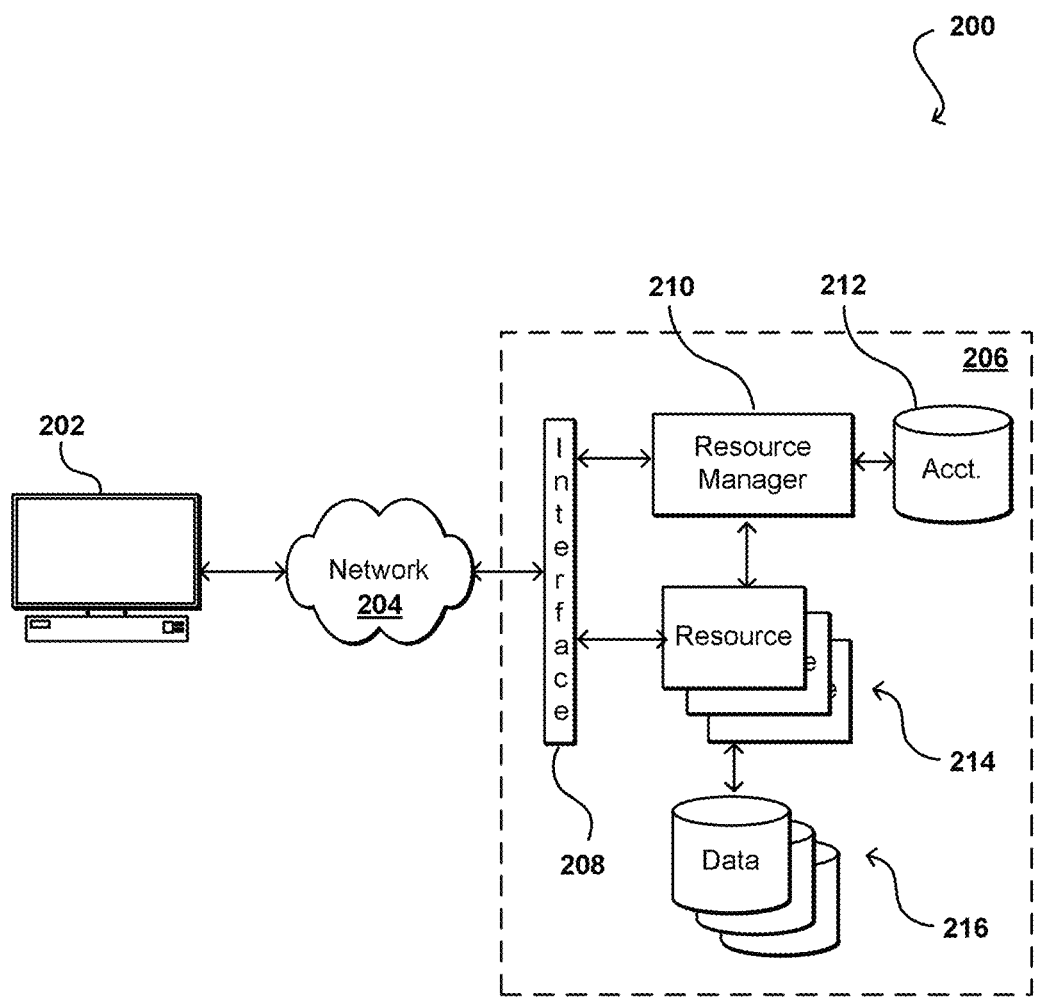
FIG. 2 illustrates an example environment in which various embodiments can be implemented.

FIG. 2 illustrates an example environment 200 in which aspects of the various embodiments can be implemented. In this example a user is able to utilize a client device 202 to submit requests across at least one network 204 to a resource provider environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. In some embodiments, a client device 202 can be an electronic device in another service or environment configured to send resource requests to a resource provider environment 206. The at least one network 204 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment (or multi-tenant environment) is often referred to as resource sharing, Web services, or "cloud computing," among other such terms and depending upon the specific environment and/or implementation. In this example the provider environment includes a plurality of resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account with the resource provider, where the account data may be stored in at least one data store 212 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 3:
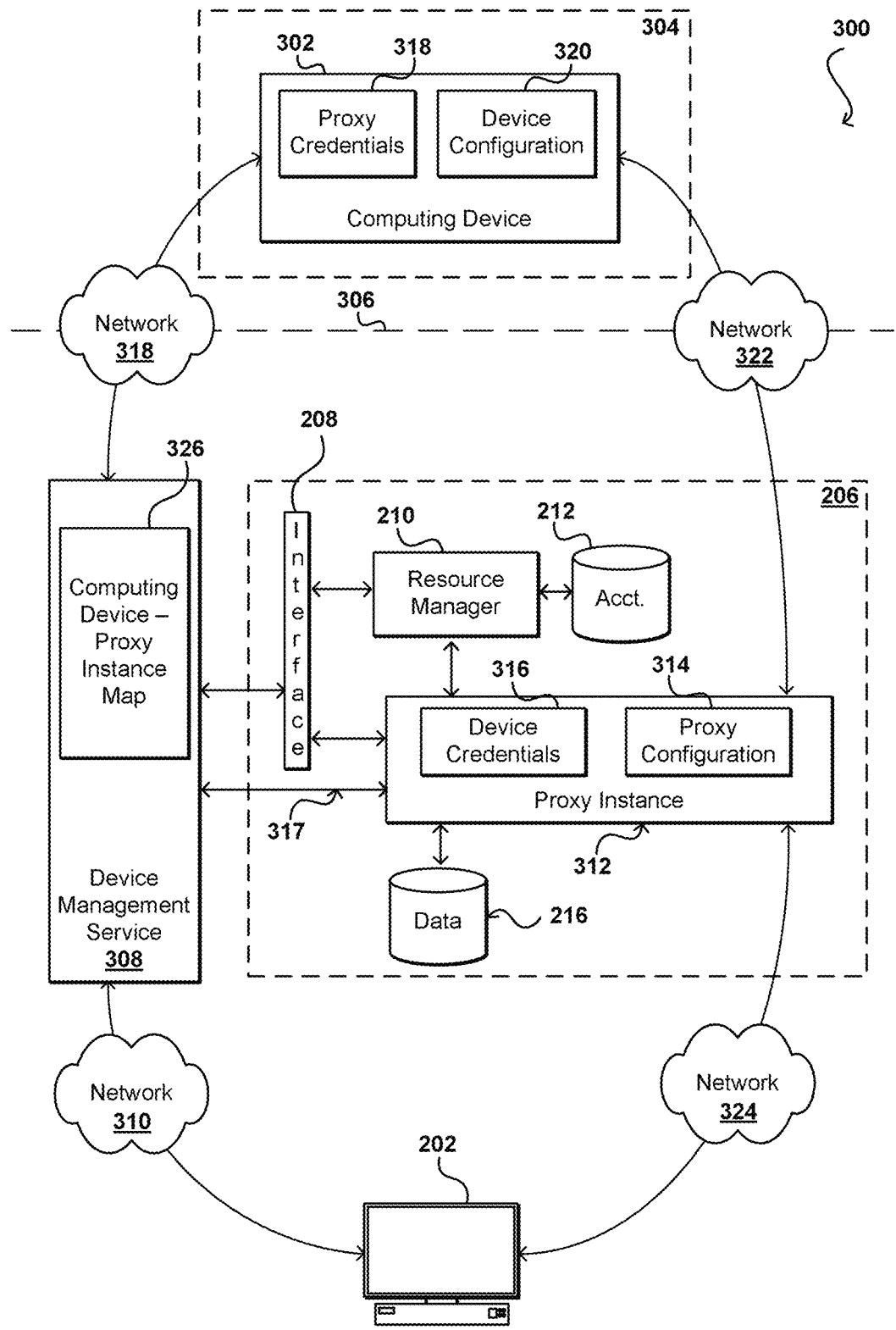
FIG. 3 illustrates an example environment wherein a device management service can communicate with various computing devices and facilitate connections with remote client devices that can be used in accordance with various embodiments.

FIG. 3 illustrates an example environment 300 wherein a device management service can communicate with various computing devices and facilitate connections with remote client devices that can be used in accordance with various embodiments. It should be understood that reference numbers for similar elements may be carried over between figures for simplicity of explanation but such usage should not be interpreted as a limitation on the various embodiments unless otherwise specifically stated. As discussed, various computing devices 302 can be deployed to a first networking environment 304, which may be separated from other networking environments by a firewall 306. A device management service 308 can manage communications between the various computing devices 302 and client devices 302. For example, as discussed above with respect to FIG. 1, computing devices 302 may include home automation sensors and controllers that communicate data to device management service 308. A user may log in to device management service 308 using client device 102 to view the data (e.g., video data from camera 106) and to, e.g., send instructions to adjust other connected computing devices (e.g., to turn off connected lamp 104). Although a user can exchange data with the computing devices 302, the user cannot reconfigure or debug the computing devices using the device management service 308.

In some embodiments, to reconfigure a deployed computing device, a user can connect to the computing device using a client device 202. Traditionally, a user may connect to a device using a remote login protocol, such as secure shell (SSH) or other remote shell protocol. However, when the computing device 302 is deployed to a first networking environment and the client device 202 is in a second networking environment, the client device may not be able to connect to computing device 302 directly. This limits the ability of a user to configure the computing device 302 from outside of networking environment 302.

One way to access devices behind a firewall is using a tunneling protocol, such as SSH tunneling. A device behind a firewall can connect to a system outside the firewall using SSH, and then a user can connect to that same system from the user's client device. The system can then tunnel traffic between the client device and the device behind the firewall. However, this requires maintaining a dedicated system to keep the connection live, which is an inefficient use of resources. Additionally, to be secure a credential exchange is required between the systems. But with potentially thousands or millions of computing devices deployed to firewalled environments, such credential exchange becomes burdensome. As such, in accordance with an embodiment, device management system can provide a centralized provisioning and credential management platform for computing devices deployed to one networking environment to facilitate communication with client devices in a different networking environment.

Device management service 308 can receive requests from client devices 202 over network 310 to connect to various computing devices 302, and instantiate a proxy device on demand. Network 310 can include can include any appropriate network, including an intranet, the Internet, a cellular network, a local area network (LAN), or any other such network or combination, and communication over the network can be enabled via wired and/or wireless connections. Device management service 308 can communicate with each computing device using a lightweight communication protocol, such as MQTT. When a computing device 302 is deployed and connected to device management service 308, device management service 308 can generate a digital certificate for the computing device, a public key, and a private key which is stored on the computing device. In some embodiments, the private key can be provisioned to the computing device by a device manufacturer, distributor, retailer, or other entity before the computing device is received by the end user. Once the computing device 302 is connected to device management service 308, the computing device can exchange data with the device management service.

In various embodiments, device management service 308 can send a request to resource provider environment 206 through interface 208 to provision a proxy device instance 312 to facilitate communication between computing device 302 and client device 202. The request can include proxy configuration information 314, such as port information, connection scripts, and other connection information. For example, configuration information 314 can include a script to create a reverse SSH tunnel from the proxy device instance 312 to computing device 302. Device management service can send device credentials 316, such as the public key associated with computing device 302, to enable proxy device instance 312 to accept secure connections from computing device 302. With the proxy device instance 312 configured to accept connections, device management service 308 can configure computing device 302 to connect to proxy device instance 312. When proxy device instance 312 is provisioned, a public/private key can be generated and the public key can be sent to device management service 308. In some embodiments, when proxy device instance 312 is provisioned, it can establish a connection 317 with device management service 308 over any appropriate network, including an intranet, the Internet, a cellular network, a local area network (LAN), or any other such network or combination, and communication over the network can be enabled via wired and/or wireless connections. Device management service 308 can communicate with the proxy instance 312 similarly to how the device management service communicates with each computing device (e.g., using a lightweight communication protocol, such as MQTT).

In some embodiments, proxy device instance 312 can provision itself a certificate in device management service 308 and publish a message that includes an identifier for the proxy device instance. Device management service 308 can send one or more public keys associated with each computing device configured to connect to that proxy device instance. Proxy device instance 312 can store the public keys and return a port mapping to be sent to the one or more computing devices to be used to connect to the proxy device instance. The port mapping can include an open, local port number for each computing device. This enables multiple devices to connect to the same proxy device instance without collisions.

Device management service 308 can send a message to computing device 302 over network 318. Network 318 can include can include any appropriate network, including an intranet, the Internet, a cellular network, a local area network (LAN), or any other such network or combination, and communication over the network can be enabled via wired and/or wireless connections. In some embodiments, the message can be sent over network 318 using a lightweight communications protocol such as MQTT, SMS, or other message protocol or channel. The message can include proxy credentials, such as the public key from proxy device instance 312, and device configuration information 320, such as an IP address associated with the proxy device instance, a connection port, and/or other connection information. In some embodiments, the message can include an instruction to securely connect to the proxy device instance. For example, computing device 312 can open an SSH connection to proxy device instance 312. Computing device 302 can then connect to proxy device instance 312 over network 320. In some embodiments, network 322 can be the same network as network 318.

With the computing device 302 and the proxy device instance 312 configured, a message can be sent to client device 202 with access information for the proxy device instance. For example, an IP address and connection port information can be sent to the client device to be used to open a secure connection to the proxy device instance. Client device 202 can then connect to the proxy device instance 312 over network 324. In some embodiments, network 324 can be the same network as network 310. In various embodiments, a user may have a proxy device instance associated with their account and can instruct device management service to associate the user's computing devices 302 with that proxy device instance. The user can provide the public key associated with that instance to be sent by device management service 318 to the computing devices.

In some embodiments, device management service 308 can maintain a computing device-proxy instance map 326, which maps device identifiers associated with the computing devices to proxy device instances. When proxy device instances are provisioned and configured to connect to particular computing devices, the map 326 can be updated to reflect the association. Similarly, when proxy device instances are deprovisioned (e.g., automatically after an inactivity period, at user instruction, etc.) the proxy device instance can be removed from the map 326. In some embodiments, a request may be received to revoke access from a computing device, for example if proxy credential information is transferred between computing devices and/or proxy device instances. Before transferring the credentials, access by the computing device can be disabled. For example, device management service 308 can identify any existing connections (e.g., SSH connections) between the computing device and any proxy device instances and close those connections before transferring or revoking the credentials. Additionally, or alternatively, any existing associations between the computing device and proxy device instances can be removed from map 326. The map enables existing instances to be continued to be utilized to connect to a computing device when subsequent requests are received from a user.

In the examples described above, instances of proxy devices are provisioned and managed in a resource provider environment. Embodiments may also be implemented in alternative architectures, such as a request driven architecture (e.g., AWS Lambda), which do not require the provisioning or management of particular instances.

Figure 4:
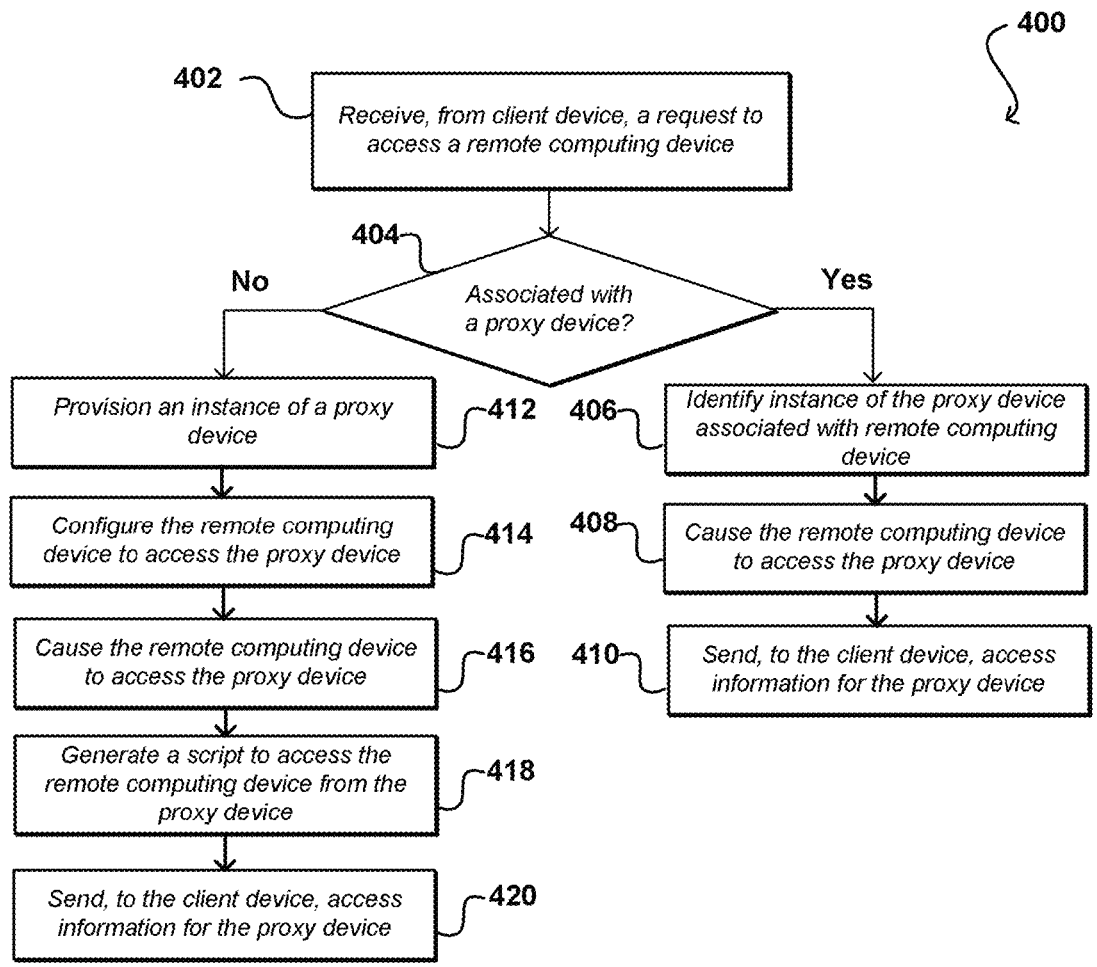
FIG. 4 illustrates an example process for managing connections to computing devices that can be utilized in accordance with various embodiments.

FIG. 4 illustrates an example process 400 for managing connections to computing devices that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request is received 402 from a client device to access a remote computing device, the request can include a device identifier. The process can then determine 404 whether the device identifier is associated with a proxy device instance.

In some embodiments, where the device identifier is determined to be associated with an instance of the proxy device, the proxy device instance associated with the computing device can be identified 406. As discussed, a computing device proxy device map can be maintained by a device management service. The remote computing device can be instructed 408 to access the instance of the proxy device. Access information can then be sent 410 to the client device to access the instance of the proxy device.

In some embodiments, where the device identifier is determined not to be associated with an instance of a proxy device, the device management service can send a request to provision 412 an instance of the proxy device. The device management service can configure 414 the instance of the proxy device instance to accept a connection from the remote computing device using credential information associated with the remote computing device. As discussed, the credential information can include a public key associated with the remote computing device. An instruction can be sent to the remote computing device to cause the remote computing device to access 416 the proxy device instance. The remote computing device can be configured to access the instance of the proxy device using the credential information associated with the proxy device instance. As discussed, the credential information associated with the proxy device instance can include a public key associated with the proxy device instance. In some embodiments, the remote computing device can be provided with IP address and connection port information associated with the proxy device instance.

A script may then be generated 418 to access the remote computing device from the instance of the proxy device. The script can include port mapping information, login information, and other information used to establish a secure connection (e.g., an SSH connection) from the instance of the proxy device to the remote computing device. In some embodiments, the script can be stored in a data store accessible to the instance of the proxy device. The client device can then be sent 420 access information for the instance of the proxy device.

In some embodiments, an association between the instance of the proxy device and the device identifier can be stored in an index or map. The index or map can maintain associations between a plurality of remote devices and a plurality of instances of the proxy device. In some embodiments, an instruction to revoke access from the remote computing device can be received, and the association between the instance of the proxy device and the device identifier can be removed from the index.

In some embodiments, each computing device may be provisioned with credential information before the computing device is received by the end user. For example, a device manufacturer, distributor, retailer, or other entity can provision the credential information to the computing device. As discussed, the device management service can request to provision an instance of the proxy device. During provisioning, the instance of the proxy device credential information can be provisioned to the instance of the proxy device. For example, a public/private key pair and certificate can be generated for the instance of the proxy device and stored on the instance.

Figure 5:
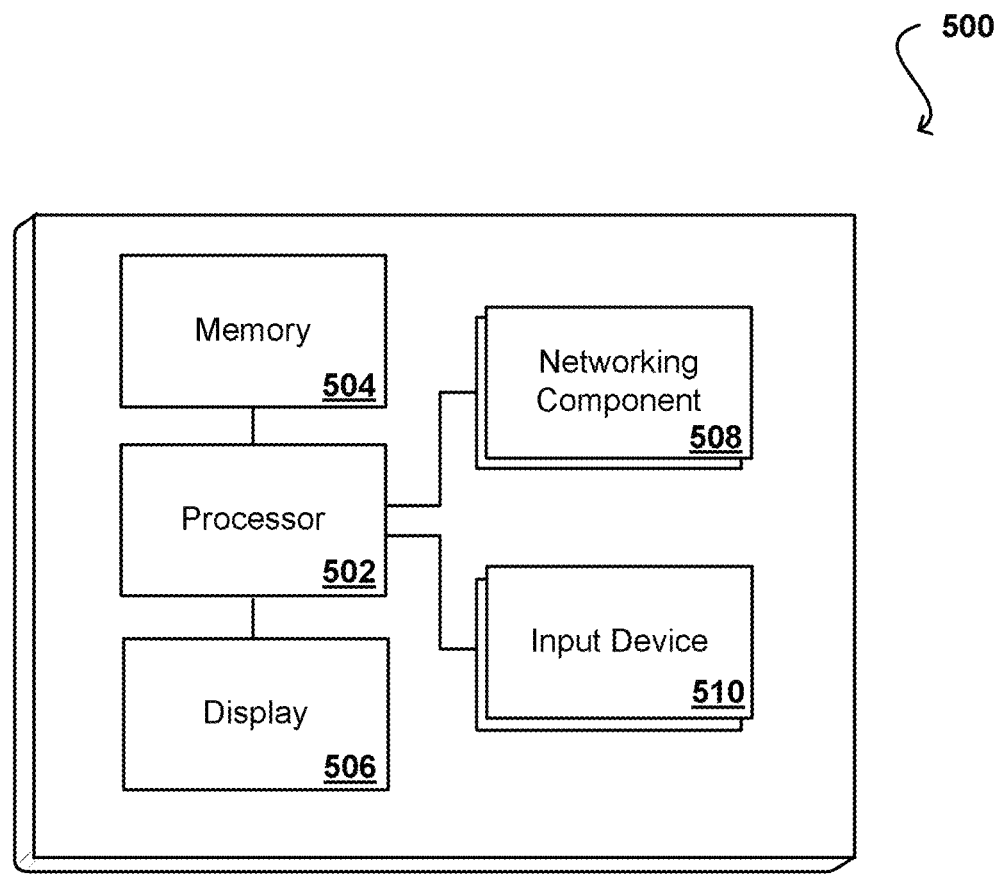
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request from a client device to access a remote computing device, the request including a device identifier;
   determining the device identifier is not associated with an instance of a proxy device;
   retrieving first credential information associated with the remote computing device;
   sending a request to provision the instance of the proxy device;
   configuring the instance of the proxy device to accept a connection from the remote computing device using the first credential information;
   receiving second credential information from the instance of the proxy device;
   configuring the remote computing device to access the instance of the proxy device using the second credential information;
   causing the remote computing device to access the instance of the proxy device;
   generating a script to access the remote computing device from the instance of the proxy device;
   storing the script in a data store accessible to the instance of the proxy device; and sending, to the client device, access information for the instance of the proxy device.

2. The computer-implemented method of claim 1, further comprising:
determining the device identifier is associated with the instance of the proxy device;
causing the remote computing device to access the instance of the proxy device; and
sending, to the client device, access information for the instance of the proxy device.

3. The computer-implemented method of claim 1, further comprising:
storing an association between the instance of the proxy device and the device identifier in an index, the index storing associations between a plurality of remote devices and a plurality of instances of the proxy device.

4. The computer-implemented method of claim 1, wherein the connection to the instance of the proxy device from the remote computing device is a first secure shell (SSH) connection and wherein the script to access the remote computing device from the instance of the proxy device, when executed, opens a second SSH connection.

5. A method, comprising:
receiving a request from a client device to access a remote computing device, the request including a device identifier;
identifying an instance of a proxy device associated with the device identifier;
configuring the instance of the proxy device to accept connections from the remote computing device using first credential information, the first credential information including a first public key associated with the remote computing device;
configuring the remote computing device to access the instance of the proxy device using second credential information, the second credential information including a second public key associated with the instance of the proxy device;
causing the remote computing device to access the instance of the proxy device; and
sending, to the client device, access information for the proxy device.

6. The method of claim 5, wherein identifying an instance of a proxy device associated with the device identifier further comprises:
determining the device identifier is not associated with the instance of the proxy device;
retrieving the first credential information associated with the remote computing device; and
sending a request to provision the instance of the proxy device.

7. The method of claim 5, wherein causing the remote computing device to access the instance of the proxy device, further comprises:
sending connection information associated with the instance of the proxy device to the remote computing device, the connection information including address information, port information, and the second credential information; and
instructing the remote computing device to open a first secure connection using the first credential information.

8. The method of claim 7, wherein the first secure connection is a first secure shell (SSH) connection and wherein the script to access the remote computing device from the instance of the proxy device, when executed, opens a second SSH connection.

9. The method of claim 5, wherein identifying an instance of a proxy device associated with the device identifier further comprises:
determining the device identifier is associated with the instance of the proxy device;
causing the remote computing device to access the instance of the proxy device; and
sending, to the client device, access information for the instance of the proxy device.

10. The method of claim 5, further comprising:
storing an association between the instance of the proxy device and the device identifier in an index, the index storing associations between a plurality of remote devices and a plurality of instances of the proxy device.

11. The method of claim 10, further comprising:
receiving an instruction to revoke access from the remote computing device; and
removing the association between the instance of the proxy device and the device identifier in the index.

12. A system, comprising:
at least one processor; and
memory including instructions that, when executed by the at least one processor, enable the system to:
receive a request from a client device to access a remote computing device, the request including a device identifier;
identify an instance of a proxy device associated with the device identifier;
configure the instance of the proxy device to accept connections from the remote computing device using first credential information, the first credential information including a first public key associated with the remote computing device;
configure the remote computing device to access the instance of the proxy device using second credential information, the second credential information including a second public key associated with the instance of the proxy device;
cause the remote computing device to access the instance of the proxy device; and
send, to the client device, access information for the proxy device.

13. The system of claim 12, wherein the instructions, when executed to identify an instance of a proxy device associated with the device identifier, further enable the system to:
determine the device identifier is not associated with the instance of the proxy device;
retrieve the first credential information associated with the remote computing device; and
send a request to provision the instance of the proxy device.

14. The system of claim 12, wherein the instructions, when executed to cause the remote computing device to access the instance of the proxy device, further enable the system to:
send connection information associated with the instance of the proxy device to the remote computing device, the connection information including address information, port information, and the second credential information; and
instruct the remote computing device to open a first secure connection using the first credential information.

15. The system of claim 14, wherein the first secure connection is a first secure shell (SSH) connection and wherein the script to access the remote computing device from the instance of the proxy device, when executed, opens a second SSH connection.

16. The system of claim 12, wherein the instructions, when executed to identify an instance of a proxy device associated with the device identifier, further enable the system to:
   determine the device identifier is associated with the instance of the proxy device;
   cause the remote computing device to access the instance of the proxy device; and
   send, to the client device, access information for the instance of the proxy device.

17. The system of claim 12, wherein the instructions, when executed by the at least one processor, further enable the system to:
   store an association between the instance of the proxy device and the device identifier in an index, the index storing associations between a plurality of remote devices and a plurality of instances of the proxy device.

18. The system of claim 17, wherein the instructions, when executed by the at least one processor, further enable the system to:
   receive an instruction to revoke access from the remote computing device; and
   remove the association between the instance of the proxy device and the device identifier in the index.

* * * * *